C. W. SALADEE,
Assignor to W. W. GRIER.
PLEASURE VEHICLES.
No. 7,889. Reissued Sept. 18, 1877.
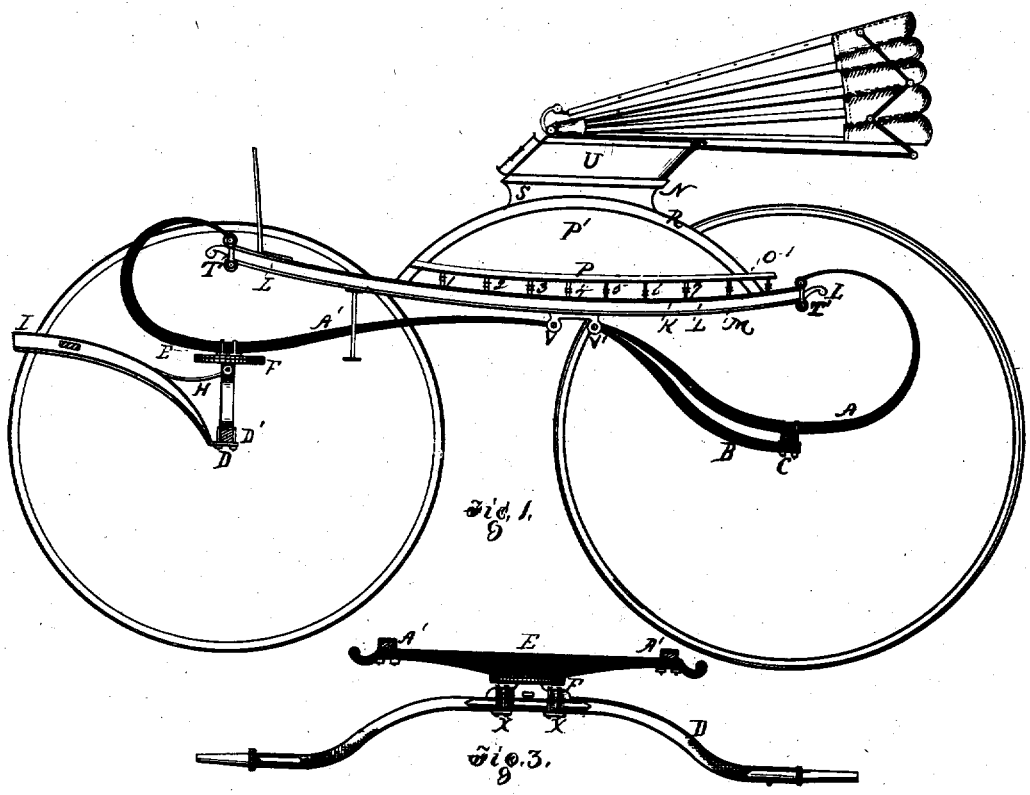
Fig. 1.
Fig. 3.
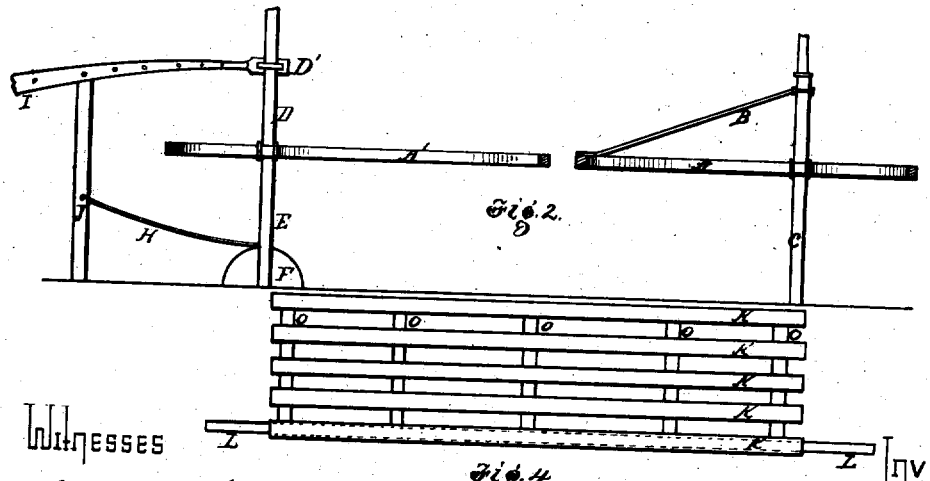
Fig. 2.
Fig. 4.
WITNESSES
R. A. Wrenshall
J. W. K. Smith
INVENTOR.
Cyrus W. Saladee
by Bakewell & Kerr
Attys

UNITED STATES PATENT OFFICE.

CYRUS W. SALADEE, OF WASHINGTON, DISTRICT OF COLUMBIA, ASSIGNOR TO WM. W. GRIER, OF HULTON, PENNSYLVANIA.

IMPROVEMENT IN PLEASURE-VEHICLES.

Specification forming part of Letters Patent No. 127,371, dated May 28, 1872; Reissue No. 7,889, dated September 18, 1877; application filed July 19, 1877.

DIVISION A.

*To all whom it may concern:*

Be it known that I, CYRUS W. SALADEE, formerly of St. Catharine's, in the Dominion of Canada, but now of Washington, District of Columbia, have invented certain Improvements in the General Construction of Light Pleasure-Vehicles, of which the following is a specification embodying my invention.

The first part of my invention relates to the general construction of light pleasure-vehicles, with the body suspended upon the axles without perch; the second part of my invention relates to the mode of constructing the body of light vehicles, whereby additional lightness and strength are secured, as well as an ornamental appearance; and the third part of the invention relates to the construction of the light running-gear, by the employment of C-springs, and generally dispensing with the use of perch and stays between the front and hind axles.

I will now proceed to describe my invention in detail, with reference to the accompanying drawing, in which—

Figure 1 is a side elevation of a complete buggy embracing my improvements. Fig. 2 is a half-plan view of the running-gear with the body removed. Fig. 3 is a front view of the front axle, fifth-wheel, and spring-bar; and Fig. 4 is a half-plan view of the bottom framework of the body.

Like letters refer to like parts wherever they occur.

That part of my invention relating to the body consists, chiefly, in making it an open frame-work. The sill-pieces L are extended at both ends, so as to answer the purpose of "body-loops." The shape of these sill pieces, from a side view, may vary, to suit the fancy of the manufacturer, and are framed to the ends of the cross pieces O. (Seen in Fig. 4.) Lengthwise the body, across the top of these cross-pieces O, are screwed the slats K, which are made about three-eighths of an inch thick by two inches wide, of hard wood, and with open spaces between of about one inch. These slats K serve as the floor of the body, and when desired the tops of them may be covered by laying loosely thereon a matting, a carpet, or an oil floor-cloth. Upon the top side of the sill-pieces L is placed or framed the arch-piece R, (seen in Fig. 1,) which is of bent hard wood, and forms the segment of a circle, and upon which is fitted the seat-rest S. On the side of the arch piece R, and about four inches from the top of the sill, is framed the rail-piece P, between which and the sill are placed the ornamental rounds 1 2 3, &c. This rail-piece P extends back of the arch R far enough to take a corresponding cross-piece over the back end of the body, and between which and the rear cross-piece of the body are placed the same kind of rounds seen in the side view of the body. In other terms, the railing P and ornamental rounds 1 2 3, &c., extend around the back end of the body, as plainly indicated in Fig. 1.

The top of the arch R is provided with a seat-rest, S, closely fitting the top of the arch-piece R, and the face side of this seat-rest coming to within one-quarter inch of the face side of the arch. This seat-rest S may be left plain, as shown, or it may be carved or cut through by "jig-sawing," in any fanciful design, and so add to its finish. Upon the seat-rest S is secured the seat U, of any pattern preferred, and cross-braced inside the body in the usual manner. The front of this body is provided with any style dash desired.

A moment will suffice to show that by this method of framing together a body I not only secure an extremely light and airy appearance to the whole vehicle, but a corresponding strength to the body is had as well.

A modification of my invention, as applied to bodies of this class, is to fill the space P′ under the arch R with a wood panel; so, also, the corresponding space across the back of the arch from N to O′, and leaving the space of the rounds 1 2 3, &c., open, as now shown; but in this case an open seat with rounds, as under the railing P, should be used.

That part of my invention relating to the gearing embraces the idea generally of "no perch," and of suspending the body upon four C-springs, with no wood-work about the gearing, except the thills or pole, and one spring-bar in front. The thills or pole and the front axle are rigidly connected at their point of contact, while the center of the axle is bowed or arched up in the center to receive the fifth-wheel F, (see Fig. 3,) and between which and the axle D is interposed a hinge-joint to admit of raising and lowering the points of the thills or pole.

In this modification of "no-perch gearing," I clip to the hind axle the C-spring A, one on each side, as seen in Fig. 1, and upon the top end of this spring are secured the rear ends of the sill L by means of the stirrup T′, as seen in the drawing. The under side of the sill L is ironed throughout its entire length, and which iron M terminates at both ends by forming an eye, through which to pass the bolt in the lower end of the stirrups T and T′.

The front spring A′ is clipped to the spring-bar over the front axle in like manner as the hind springs to the axle. To secure the inner end of the springs to the body, ears V and V are formed solid upon the iron plate M on the under side of the sill L, at or near the center of the body, into which the inner ends of the springs are hinged by means of a bolt passing through these ears and the eye in the end of the spring, and so the body, hind axle, and spring-bar over the front axle are all connected together, as designed. And now, for the purpose of protecting the springs against side or end strain, a brace, B, Figs. 1 and 2, may be applied, as shown. But the "under brace" and "carrier-brace," which are described in Division B of this reissue, will be found as admirably adapted in combination with this form of C-spring as with the half-elliptic spring, and which last named braces I shall generally use in connection with the "C-spring no-perch gearing."

Between the fifth-wheel and the front axle is interposed the hinge-joint, plainly shown by Fig. 3. The front axle D is arched up in the center to receive the fifth-wheel, as shown in the last-named figure. The thills or pole are rigidly clipped to the front axle at D′, as seen by Fig. 2, and to support the arch of the axle in its rigidly relative position to the cross-bar of the thills or pole two braces, H, are extended from one to the other, so that, in raising or lowering the points of the thills, the hinge-joints interposed between the fifth-wheel and the front axle are operated upon, and which admit of this movement freely.

These hinge-joints under the fifth-wheel are rendered "anti-rattling" by an improvement I have secured in a former patent, and by which, when the vehicle is not in use, the points of the thills may be raised up out of the way until their cross-bar rests against the front springs, and where they will be firmly held by reason of the center of gravity upon the fifth-wheel having been thrown back past the center of the bearings of the axle in the wheels, and so the weight of the front end of the body will hold the thills or pole in this raised position, without other provision.

I have thus produced the lightest possible form of pleasure-vehicle, embracing superior strength, simplicity of construction, stylish in appearance, and is unsurpassed for the ease of motion attained by the peculiar arrangement of the C-springs, in combination with the body and axles, and dispensing, when desired, with the use of perch and the ordinary amount of superfluous wood and iron work.

Having thus described my invention, what I claim, and desire to secure by Letters Patent, is—

1. In buggy-bodies, the arch R, or its equivalent, in combination with the railing P and sills L, substantially as shown and described.

2. The slatted bottom O and K of the body, when the sills are provided with the railing P, or other appropriate side, substantially as and for the purpose set forth.

3. In combination with the arch R and railing P, the wood panels P′, with or without the corresponding panel across the back of the arch, substantially as shown and described.

4. In combination with a slatted-bottom body, the extension-sills L, as a substitute for "body-loops," substantially as shown and described.

5. Four C-springs, in combination with the body, front spring-bar, and hind axle of the vehicle, and with the under brace B, substantially as and for the purpose described.

6. The combination of the arched axle D, thills D′, and brace or braces H, substantially as and for the purpose specified.

In testimony that I claim the above as my invention I hereunto set my hand this 21st day of April, 1877.

CYRUS W. SALADEE.

Witnesses:
GEORGE SHERMAN,
GEO. A. BLAKE.